(12) United States Patent
Garelli et al.

(10) Patent No.: US 10,019,038 B2
(45) Date of Patent: *Jul. 10, 2018

(54) ELECTRONIC DEVICE WITH DYNAMIC HINGE GAP COVER

(71) Applicant: Apple Inc., Cupertino, CA (US)

(72) Inventors: Adam T. Garelli, Santa Clara, CA (US); Dinesh C. Mathew, Fremont, CA (US); Robert Y. Cao, San Francisco, CA (US); Simon Lancaster Larocque, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,940

(22) Filed: Sep. 19, 2016

(65) Prior Publication Data

US 2017/0010637 A1    Jan. 12, 2017

Related U.S. Application Data

(63) Continuation of application No. 14/704,447, filed on May 5, 2015, now Pat. No. 9,513,672.

(51) Int. Cl.
  *G06F 1/16*     (2006.01)
  *E05D 11/00*    (2006.01)
  *G06F 1/20*     (2006.01)

(52) U.S. Cl.
  CPC ........ *G06F 1/1681* (2013.01); *E05D 11/0054* (2013.01); *E05D 11/0081* (2013.01);
  (Continued)

(58) Field of Classification Search
  CPC ...... G06F 1/1681; G06F 1/1683; G06F 1/203; E05D 11/0054; E05D 2011/0072; E05D 11/0081
  (Continued)

(56) References Cited

U.S. PATENT DOCUMENTS

| 4,959,887 A | 10/1990 | Gruenberg et al. |
| 4,996,522 A | 2/1991 | Sunano |

(Continued)

FOREIGN PATENT DOCUMENTS

| CN | 101534331 A | 9/2009 |
| CN | 102467170 A | 5/2012 |

(Continued)

OTHER PUBLICATIONS

International Patent Application No. PCT/US2016/030816—International Search Report and Written Opinion dated Aug. 19, 2016.

(Continued)

*Primary Examiner* — Nidhi Thaker

(74) *Attorney, Agent, or Firm* — Dickinson Wright RLLP

(57) ABSTRACT

An electronic device may be provided with upper and lower housing portions that are separated by a gap. Hinge structures may allow the upper housing portion to rotate between a closed position and an open position. A flexible printed circuit in the electronic device may be coupled between components in the upper housing portion such as the display and components in the lower housing portion and may span the gap. A hinge gap cover may cover the gap and may overlap the flexible printed circuit to block the flexible printed circuit from view when the upper housing portion is in the closed position. The hinge gap cover may be formed from a layer of radio-transparent material that is rotatably coupled to the upper housing portion and that is biased towards the lower housing with a spring structure.

20 Claims, 15 Drawing Sheets

(52) U.S. Cl.
CPC .......... *G06F 1/1616* (2013.01); *G06F 1/1637* (2013.01); *G06F 1/1662* (2013.01); *G06F 1/1683* (2013.01); *G06F 1/203* (2013.01); *E05D 2011/0072* (2013.01)

(58) Field of Classification Search
USPC .................. 361/679.27, 679.28; 16/221–392
See application file for complete search history.

(56) References Cited

U.S. PATENT DOCUMENTS

| | | | |
|---|---|---|---|
| 5,177,672 A * | 1/1993 | Ito | G06F 1/1616 361/741 |
| 5,581,440 A | 12/1996 | Toedter | |
| 5,799,079 A | 8/1998 | Inoue | |
| 5,927,997 A * | 7/1999 | Ruland | G06F 1/1616 361/679.27 |
| 6,212,069 B1 | 4/2001 | Janik et al. | |
| 7,907,415 B2 | 3/2011 | Ueyama | |
| 8,014,139 B2 | 9/2011 | Maeda et al. | |
| 8,618,415 B2 | 12/2013 | Wennemer et al. | |
| 8,994,597 B2 | 3/2015 | Hill et al. | |
| 2004/0264118 A1* | 12/2004 | Karidis | G06F 1/1616 361/679.55 |
| 2006/0279942 A1 | 12/2006 | Yasuda | |
| 2007/0123179 A1* | 5/2007 | Lim | H04M 1/0237 455/90.3 |
| 2008/0013265 A1 | 1/2008 | Kim | |
| 2008/0019085 A1 | 1/2008 | Nakajima | |
| 2008/0297991 A1* | 12/2008 | Ou | G06F 1/1616 361/824 |
| 2009/0002931 A1* | 1/2009 | Iijima | G06F 1/1601 361/679.27 |
| 2012/0092820 A1* | 4/2012 | Hautamaki | H04M 1/0237 361/679.02 |
| 2013/0058048 A1* | 3/2013 | Choi | G06F 1/1624 361/727 |
| 2013/0328741 A1* | 12/2013 | Degner | G06F 1/1658 343/841 |
| 2014/0043748 A1 | 2/2014 | Sartee et al. | |
| 2014/0213324 A1 | 7/2014 | Tan et al. | |
| 2014/0228272 A1 | 8/2014 | Imamura et al. | |
| 2014/0292646 A1 | 10/2014 | Kawamoto et al. | |
| 2014/0293519 A1 | 10/2014 | Wang | |
| 2015/0049275 A1 | 2/2015 | Posner et al. | |
| 2016/0014915 A1 | 1/2016 | Posner et al. | |
| 2018/0113493 A1 | 4/2018 | Silvanto et al. | |

FOREIGN PATENT DOCUMENTS

| | | |
|---|---|---|
| CN | 203465630 U | 3/2014 |
| CN | 104076919 A | 10/2014 |
| EP | 1313358 A2 | 5/2003 |
| JP | 2010066905 A | 3/2010 |

OTHER PUBLICATIONS

Chinese Patent Application No. ZL2016204018812—Evaluation Report for Utility Model Patentability dated Feb. 24, 2017.

* cited by examiner

US 10,019,038 B2

ELECTRONIC DEVICE WITH DYNAMIC HINGE GAP COVER

CROSS-REFERENCE TO RELATED APPLICATION

This Application is a continuation of U.S. application Ser. No. 14/704,447, filed May 5, 2015, entitled "ELECTRONIC DEVICE WITH DYNAMIC HINGE GAP COVER", now U.S. Pat. No. 9,513,672 issued Dec. 6, 2016, the content which is incorporated herein by reference in its entirety for all purposes.

BACKGROUND

This relates generally to electronic devices and, more particularly, to electronic devices with hinged housings such as laptop computers.

Laptop computers include upper and lower housings that are coupled by hinges. A keyboard and track pad are mounted in the lower housing. A display is mounted in the upper housing. The hinges allow the upper housing to be rotated with respect to the lower housing, so that the computer can be opened and closed and so that the angle of the display can be adjusted when the computer is open.

Gaps can develop between the upper and lower housings along a hinge axis that is located between the hinges. The gaps create clearance between the upper and lower housings. This clearance allows the upper housing to be moved with respect to the lower housing without interference from the lower housing, but can allow a user to view components within the interior of the computer and can allow dust and other contaminants to enter into the interior of the computer.

It would therefore be desirable to be able to provide improved hinge gap arrangements for electronic devices such as laptop computers.

SUMMARY

An electronic device such as a laptop computer may be provided with upper and lower housing portions that are separated by a gap. Hinge structures may allow the upper housing portion to rotate between a closed position in which a display in the upper housing portion is adjacent to the lower housing portion and an open position in which the display is visible to a user.

A flexible printed circuit in the electronic device may be coupled between components in the upper housing portion such as the display and components in the lower housing portion. The flexible printed circuit may bridge the gap. A hinge gap cover may cover the gap and may overlap the flexible printed circuit to block the flexible printed circuit from view when the upper housing portion is in the closed position.

The hinge gap cover may be formed from a radio-transparent material that is coupled to the upper housing portion with springs. An antenna in an interior portion of the housing may transmit and receive antenna signals that pass through the hinge gap housing.

Part of the upper housing portion may form a stop surface. When the upper housing portion is in the closed position, the stop surface may be separated from the hinge gap cover and the springs may hold the hinge gap cover in place over the gap. An inner surface in the lower housing portion may contact an edge of the hinge gap cover to prevent the hinge gap cover from rotating. When the upper housing is moved into the open position, the stop surface may contact the hinge gap cover and may push the hinge gap cover away from the lower housing and the gap.

The hinge gap cover may be bowed inwardly towards the interior of the housing when the upper housing portion is in the closed position. The flexible printed circuit may have a surface that is adjacent to the bowed surface of the hinge gap cover when the upper housing portion is in the closed position.

DETAILED DESCRIPTION

Figure 1:
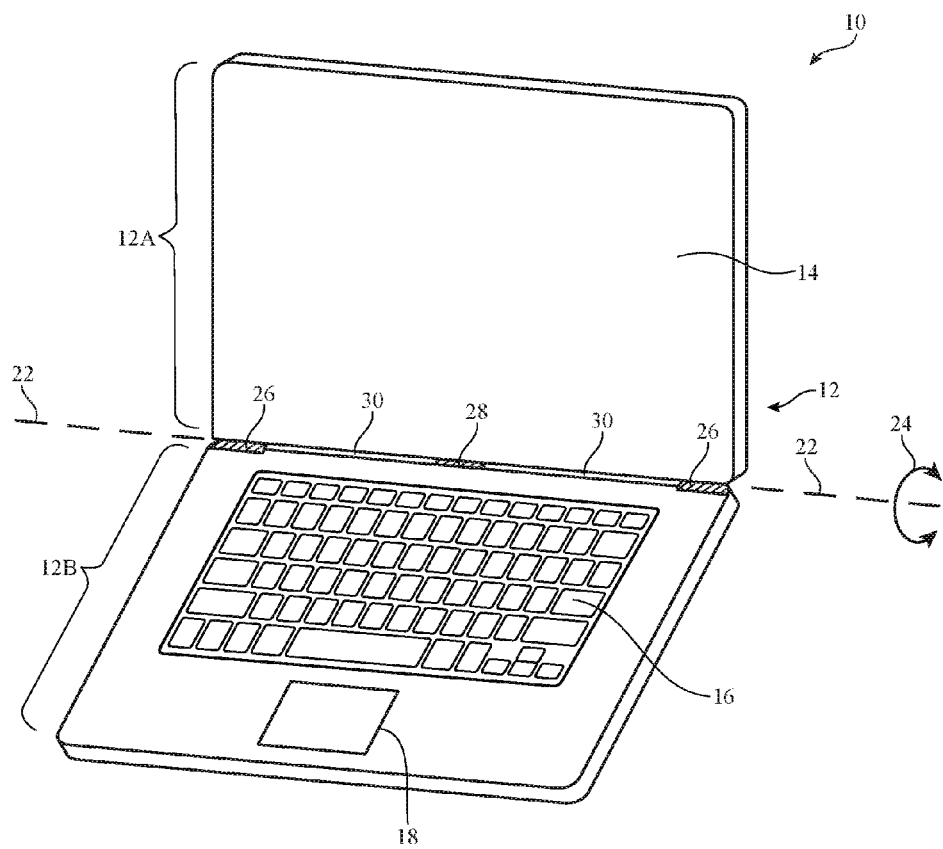
FIG. 1 is a perspective view of an illustrative electronic device such as a laptop computer having a lid in an open position in accordance with an embodiment.

An electronic device such as electronic device 10 of FIG. 1 may have structures such as housing structures that move with respect to each other about a hinge axis. A gap in the housing structures may be fully or partly covered with a hinge gap cover. The hinge gap cover may be deployed using springs formed from spring-loaded shafts (e.g., shafts that rotate within pivots and that are biased by springs that are coupled to the shafts), springs that bias the hinge gap covers directly (e.g., springs that press against the hinge gap covers in configurations in which the covers are mounted to shafts that pivot within pivot structures so that the hinge gap covers open and close), or other biasing structures that allow the hinge gap cover to open and close as the housing structures are moved about the hinge axis.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, or may be other electronic equipment. Configurations in which device 10 has housing structures such as a housing lid and base that rotate with respect to each other about a hinge axis are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

As shown in FIG. 1, device 10 may have input-output devices such as track pad 18 and keyboard 16. Device 10 may also have components such as a camera, microphones, speakers, buttons, removable storage drives, status indicator lights, buzzers, sensors, and other input-output devices. These devices may be used to gather input for device 10 and may be used to supply a user of device 10 with output. Ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (i.e., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have housing portions that move with respect to each other. As shown in FIG. 1, for example, electronic device 10 may be a device such as a portable computer or other device that has a two-part housing including an upper housing portion such as upper housing portion 12A that moves with respect to a lower housing portion such as lower housing portion 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the junction between the upper edge of lower housing 12B and the opposing lower edge of upper housing 12A. For example, housings 12A and 12B may be coupled by hinges 26. Hinges 26 may be located at opposing left and right edges of housing 12 along hinge axis 22 or may be located at other locations along hinge axis 22 between housing portions 12A and 12B. A slot-shaped opening such as gap 30 may be formed between upper housing 12A and lower housing 12B and may be bordered on either end by hinges 26.

Gap 30 runs along hinge axis 22 and may therefore sometimes be referred to as a hinge gap. Hinges 26 may allow upper housing 12A to rotate about axis 22 in directions 24 relative to lower housing 12B. The plane of lid (upper housing) 12A and the plane of lower housing 12B may be separated by an angle that varies between 0° when the lid is closed to 90°, 140°, or more when the lid is fully opened.

Signal paths may extend between upper housing 12A and lower housing 12B. These signal paths may be formed by metal traces on a flexible printed circuit (e.g., a flexible printed circuit formed from a flexible layer of polyimide or a sheet of other flexible polymer substrate material), coaxial cables, wires, or other signal path structures. For example, signal paths formed from one or more flexible printed circuits 28 may bisect the slot formed from gap 30 as shown in FIG. 1 or may cross gap 30 at one or more other locations along the length of gap 30 (as examples).

Speakers may be located within housing 12. Housing 12 may have perforations such as circular holes or may use portions of gap 30 or other speaker openings to allow sound to exit the interior of device 10. Openings in housing 12 and/or gap 30 may also be used to vent heated air from the interior of device 10 and may serve as antenna apertures through which antenna signals pass during wireless communications.

Gap 30 may have portions that are exposed to the front of device 10 (i.e., the portion of gap 30 that is visible in FIG. 1) and portions that are exposed to the rear of device 10. The rear portion of hinge gap 30 and, if desired, front portions of gap 30 may be partly or fully covered with hinge gap cover structures. A hinge gap cover may be formed from a thin sheet of material that can help cover gap 30. When gap 30 is covered, potentially unsightly internal components may be hidden from view. The hinge gap cover may also help prevent intrusion of contaminants such as dust and moisture into the interior of device 10. The hinge gap cover may be a movable structure that covers gap 30 when device 10 is closed and that does not cover gap 30 when device 10 is opened (as an example).

Figure 2:
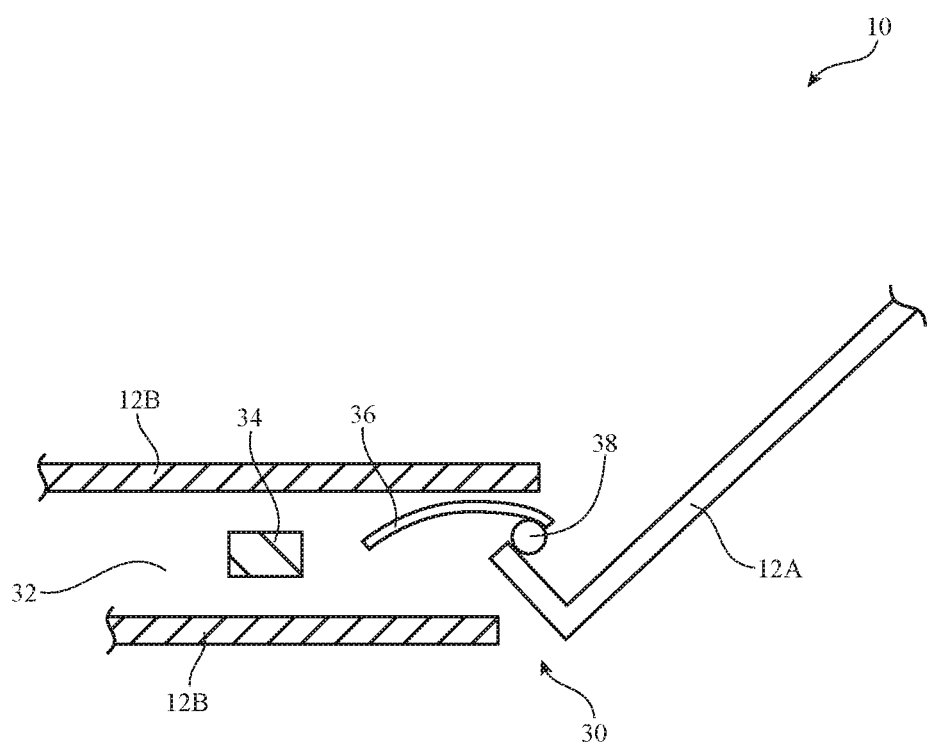
FIG. 2 is a cross-sectional side view of an illustrative electronic device in an open position in accordance with an embodiment.

A cross-sectional side view of a portion of device 10 taken across gap 30 when device 10 is in an open position (i.e., when lid 12A is open) is shown in FIG. 2. As shown in FIG. 2, device 10 may have an interior region such as interior region 32. Components 34 may be mounted in interior region 32. Components 34 may include sensors, integrated circuits, wireless transceivers and other wireless circuitry, antenna structures (e.g., impedance matching circuits, dielectric support structures for antenna resonating elements, feed structures, tuning circuits, amplifiers, etc.), batteries, input-output devices, port connectors, printed circuits, and other electrical components. As an example, component 34 of FIG. 2 may be an antenna or part of an antenna that emits and receives antenna signals through gap 30 (e.g., a portion of gap 30 along the front of device 10 and/or a portion of gap 30 along the rear of device 10).

Hinge gap cover 36 may be used to cover gap 30. Hinge gap cover 36 may, for example, cover gap 30 when upper housing 12A is closed and may be pulled away from gap 30 as shown in FIG. 2 when housing 12B is in an opened position. When device 10 is open, gap 30 may be smaller due to the reduced size of the space between housing 12A and 12B and may not be visible to a user who is located in front of device 10 to view display 14. When closed, gap 30 may become larger due to an increased spacing between housing 12A and 12B and may be more visible to a user (e.g., when device 10 is placed upside down on a table). By using hinge gap cover 36, a user's view into the interior of device 10 may be fully or at least partly blocked when device 10 is in its closed position.

In the illustrative configuration of FIG. 2, hinge gap cover 36 has been mounted to upper housing 12A using spring 38. Spring 38 may be, for example, a torsion spring, or other flexible coupling member that causes an edge of cover 36 to press against housing 12B when upper housing 12A is in a closed position. Hinge gap cover 36 may be rotatably mounted to housing 12A (e.g., by mounting hinge gap cover 36 to a shaft that rotates within pivot structures attached to housing 12A or by mounting hinge gap cover 36 to a pivot structures that receive a shaft that is mounted to housing 12A). In these types of arrangements, spring 38 may be a spring structure that includes a flexible sheet metal spring or other spring to bias hinge gap cover 36 directly (e.g., spring 38 may press cover 36 into its closed position when lid 12A is closed). If desired, spring 38 may be a spring structure with a shaft that is biased with a spring (i.e., spring 38 may be a spring-loaded shaft or other rotatable structure that is mounted to housing 12A using pivot structures and which is rotated by a torsion spring or other spring that loads the shaft). In a spring-loaded shaft configuration, cover 36 may be attached to the spring-loaded shaft with welds, adhesive, or other fastening structures and may be rotatably coupled to housing 12A by mounting the shaft in pivot structures attached to housing 12A. Rotation of the shaft by the spring may rotate cover 36 against housing 12B (e.g., the shaft of spring 38 may be loaded by a torsion spring element or other spring structure so that cover 36 is biased against housing 12B and thereby effectively seals gap 30 to prevent intrusion of contaminants and block interior portions of device 10 from view). If desired, other types of mounting arrangement may be used. For example, cover 36 may be mounted on lower housing 12B, may have portions that are mounted respectively on upper housing 12A and lower housing 12B, may be mounted to housing 12 using welds, fasteners, adhesive, or other attachment mechanisms in addition to spring 38 or instead of spring 38, etc. The arrangement of FIG. 2 in which hinge gap cover 36 is mounted to upper housing 12A using spring 38 is merely illustrative.

Figure 3:
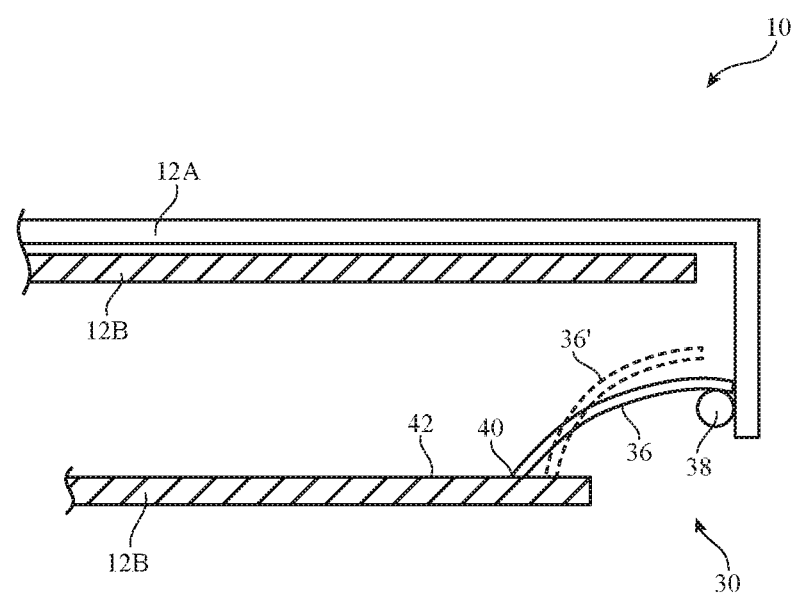
FIG. 3 is a cross-sectional side view of the illustrative electronic device of FIG. 2 in a closed position in accordance with an embodiment.

FIG. 3 is a cross-sectional side view of device 10 in a configuration in which upper housing 12A has been rotated into a closed position. Just before closing, the hinge gap cover may be in position 36' and may begin to contact lower housing 12B. As housing 12A is rotated into its final closed position, spring 38 allows the hinge gap cover to rotate about the axis of spring 38, so that the hinge gap cover moves into the position shown by hinge gap cover 36 of FIG. 12B. The position of hinge gap cover 36 on upper housing 12A helps ensure that outer edge 40 of hinge gap cover 36 will contact inner surface 42 of the lower wall of housing portion 12B. The flexibility of spring 38 may prevent hinge gap cover 36 from being overly stressed from this contact (i.e., spring 38 allows cover 36 to "give" as needed to prevent detachment of cover 36 from housing 12A). If desired, hinge gap cover 36 may also be flexible and may deflect slightly when contacting housing 12B.

Hinge gap cover 36 may be formed from metal, plastic, glass, ceramic, carbon-fiber composites, fiberglass, and other fiber-based composites, other material, or combinations of these materials. With one suitable arrangement, hinge gap cover 36 is formed from a thin sheet of material (e.g., material with a thickness of less than 4 mm, less than 2 mm, less than 1 mm, or less than 0.5 mm) such as fiberglass or plastic that is radio transparent. By using a material that is radio-transparent (e.g., a material that is a dielectric rather than a conductor), antenna signals may pass through gap 30 even when gap 30 is covered with cover 36. For example, component 34 (e.g., an antenna) may transmit and receive radio-frequency signals that pass through cover 36. Configurations in which hinge gap cover 36 or portions of hinge gap cover 36 are formed from thin sheets of metal (e.g., stainless steel or other metal having a thickness of 4 mm, less than 2 mm, less than 1 mm, or less than 0.5 mm, etc.) may also be used.

Figure 4:
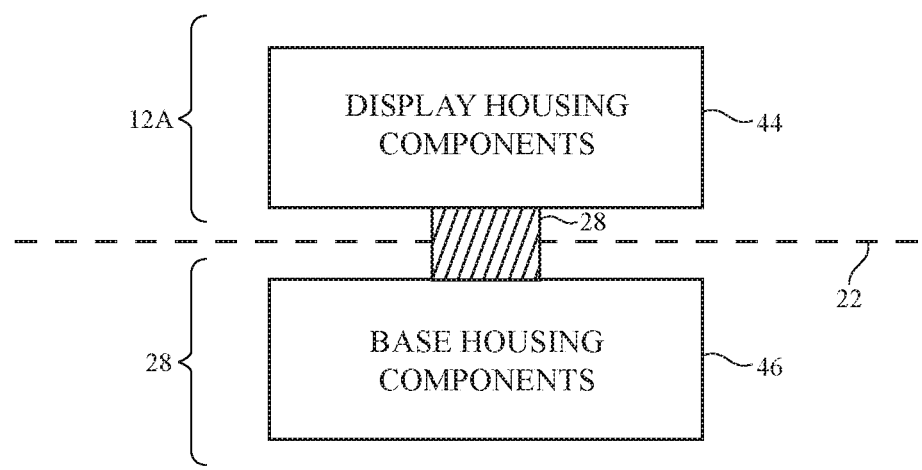
FIG. 4 is a diagram of illustrative circuitry in an electronic device that is coupled together using a flexible signal path that crosses a hinge axis between housing structures in accordance with an embodiment.

As shown in FIG. 4, components in upper housing 12A such as display housing components 44 may be coupled to components in lower housing 12B such as base housing components 46 by one or more flexible printed circuits such as flexible printed circuit 28 or other flexible signal paths. Display housing components 44 may include components such as a camera, display 14, a touch sensor (e.g., a touch sensor built into display 14), an ambient light sensor, a light-emitting diode or other device that serves as a status indicator, and other electrical components. Base housing components 46 may include processor circuits, memory circuits, and other control circuitry, communications ports, sensors, input-output devices, track pad 18, keyboard 16, etc. During operation of device 10, upper housing 12A and lower housing 12B may rotate relative to each other about hinge axis 22, causing flexible printed circuit 28 to bend. To ensure that metal traces on flexible printed circuits 28 do not experience excessive stress, flexible printed circuit 28 may be provided with a looped portion that allows flexible printed circuit 28 to move back and forth to accommodate opening and closing of device 10.

In configurations of the type shown in FIG. 4 in which a signal path formed from flexible printed circuit 28 bridges hinge axis 22 (and gap 30), it may be desirable to mount hinge gap cover 36 in a position that overlaps flexible printed circuit 28 and thereby blocks flexible printed circuit 28 from view. As shown in the rear perspective view of device 10 in FIG. 5, for example, hinge gap cover 36 may be mounted in device 10 so that hinge gap cover 36 overlaps and covers flexible printed circuit 28. In the illustrative arrangement of FIG. 5, hinge gap cover 36 overlaps only parts of gap 30, so that end portions of gap 30 that are not covered by hinge gap cover 36 can serve as ports for device 10 (e.g., to permit air to flow between the interior of device 10 and the exterior of device 10).

Hinge gap cover 36 may have an elongated rectangular shape that extends along the rear edge of device 10 parallel to hinge axis 22. Springs 38 may be located at opposing ends of hinge gap cover 36 or may be attached elsewhere along the length of cover 36. There is one hinge gap cover 36 in the example of FIG. 5. If desired, there may be multiple hinge gap covers 36 in device 10 each of which covers a respective portion of gap 30. In the FIG. 5 configuration, hinge gap cover 36 is centered along the length of gap 30, but cover 36 may be placed closer to one end of gap 30 than the other. Housing 12B may have extended portions 12B'. Hinges 26 (FIG. 1) may be covered by portions 12B' and gap 30 may extend between portions 12B'. If desired, housing 12B may have a centrally located extended portion that covers flexible printed circuit 28 or may have other extended housing portions.

Figure 5:
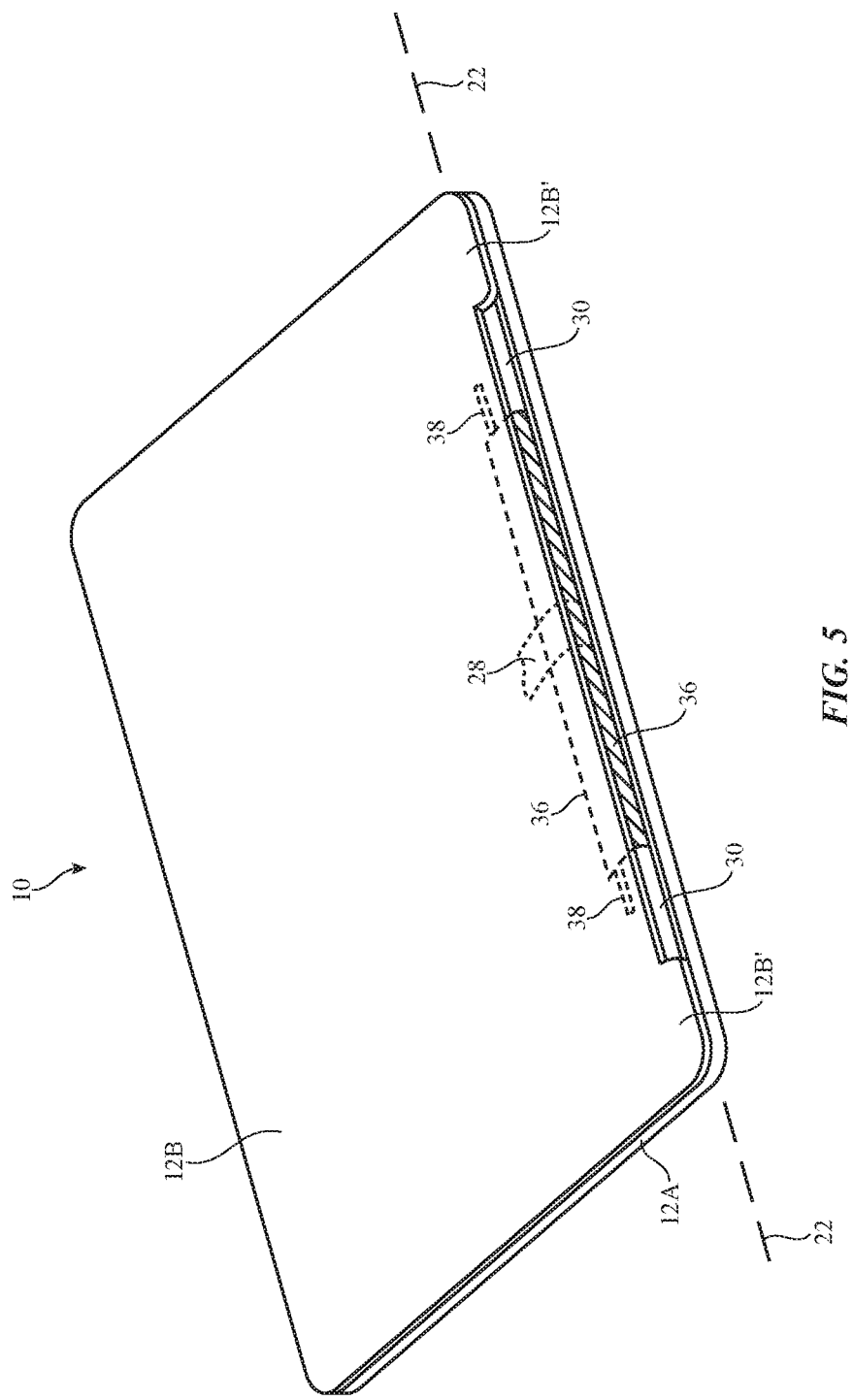
FIG. 5 is rear perspective view of an illustrative electronic device such as the laptop computer of FIG. 1 showing how a gap between upper and lower housings may be at least partly covered using a hinge gap cover in accordance with an embodiment.
Figure 6:
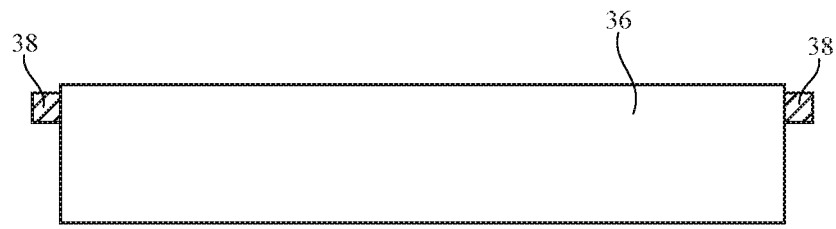
FIG. 6 is a diagram of an illustrative solid hinge gap cover in accordance with an embodiment.
Figure 7:
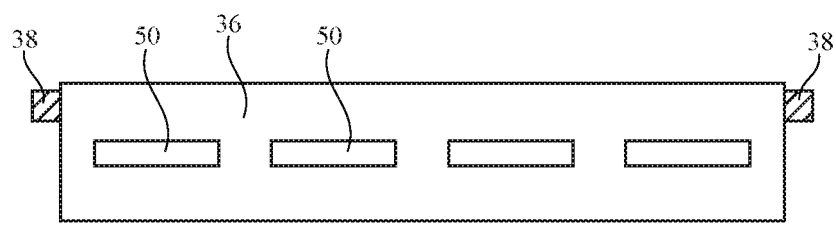
FIG. 7 is a diagram of an illustrative hinge gap cover with openings in accordance with an embodiment.
Figure 8:
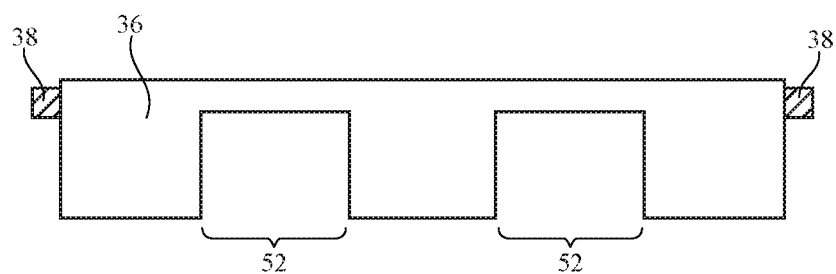
FIG. 8 is a diagram of an illustrative hinge gap cover with slot-shaped openings in accordance with an embodiment.

Hinge gap cover 36 may have an elongated rectangular shape as shown in FIG. 6. In this type of configuration, the ends of cover 36 may be recessed from hinges 26 and extended housing portions 12B', as shown in FIG. 5. If desired, cover 36 may have openings such as openings 50 of FIG. 7. Openings 50 may run along the length of cover 36 (i.e., cover 36 may have a longitudinal axis that runs parallel to hinge axis 22 and openings 50 may include a set of rectangular openings or openings 50 of other shape that extend along the longitudinal axis). When cover 36 of FIG. 7 is installed within device 10, openings 50 may overlap gap 30, so that air can flow through openings 50. As shown in the illustrative configuration of FIG. 8, hinge gap cover 36 may have openings such as recesses (notches) 52. Recesses 52 may be distributed along the length of cover 36 and may overlap gap 30 to provide air passages between the interior of device 10 and the exterior of device 10. The illustrative configurations for hinge gap cover 36 of FIGS. 6, 7, and 8 are merely illustrative. Cover 36 may have outlines of other shapes and/or may have openings of other shapes.

Figure 9:
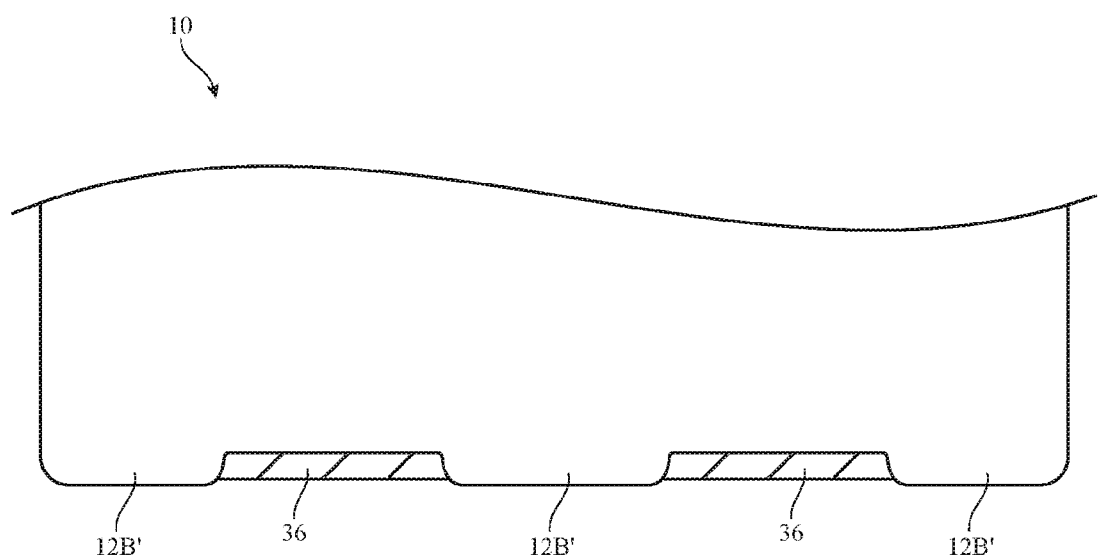
FIG. 9 is a rear view of an illustrative electronic device such as a laptop computer showing how a protruding portion of the lower housing of the device may cover part of a hinge gap in accordance with an embodiment.

As shown in the illustrative rear view of device 10 of FIG. 9, housing 12B may have extended portions 12B' at the left and right edges of device 10 and a central extended portion 12B that is centered along the rear edge of housing 12B between the left and right extended portions 12B'. Gap 30 may have uncovered portions or may be covered with hinge gap cover 36 as shown in FIG. 9.

Figure 10:
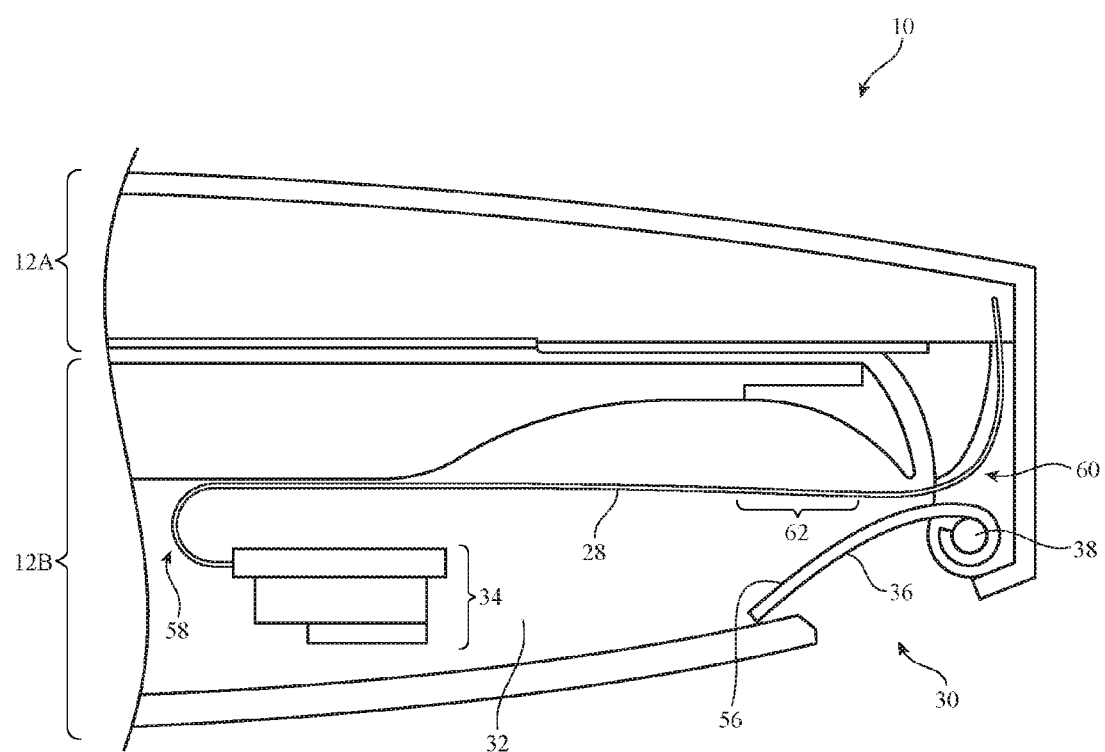
FIG. 10 is a cross-sectional side view of an illustrative laptop computer in a closed position in which a hinge gap cover is used in covering a housing gap in accordance with an embodiment.
Figure 11:
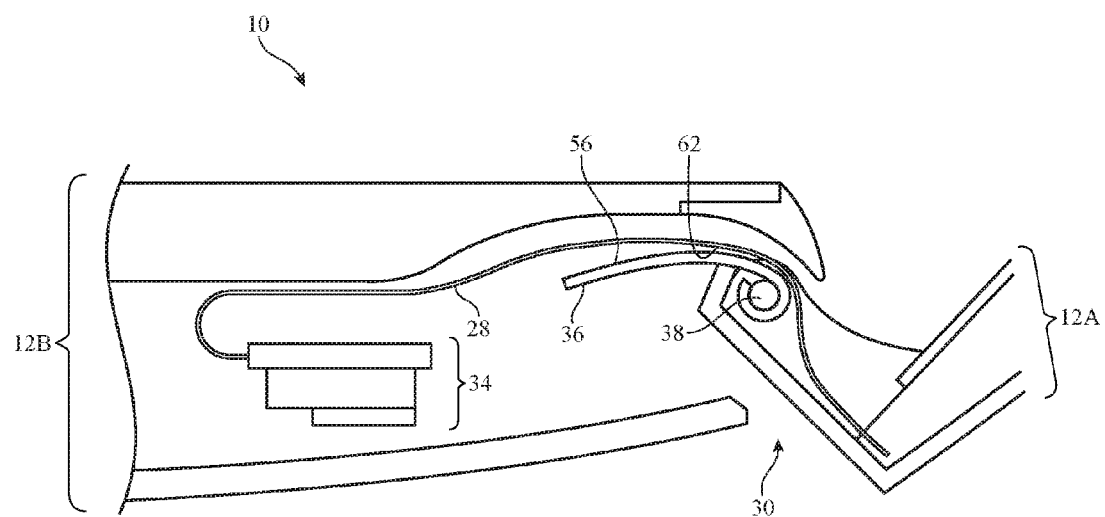
FIG. 11 is a cross-sectional side view of the illustrative laptop computer of FIG. 10 in an open position in accordance with an embodiment.

Hinge gap cover 36 may have a curved profile that helps accommodate flexible printed circuit 28 without damaging flexible printed circuit 28. A cross-sectional side view of device 10 in an illustrative configuration in which hinge gap cover 36 has a curved (bent) shape is shown in FIG. 10. As shown in FIG. 10, internal components 34 may be coupled to flexible printed circuit 28 within interior of device 10. Flexible printed circuit 28 may have bends such as bend 58 and bend 60. During movement of upper housing 12A relative to lower housing 12B, flexible printed circuit 28 may flex at bends 58 and 60. Inner surface 56 of hinge gap cover 36 may have a convexly curved surface. With this arrangement, hinge gap cover 36 bows inwardly towards flexible printed circuit 28. The curved shape of surface 56 may help reduce wear and sharp bends in flexible printed circuit 28 when flexible printed circuit 28 bears against surface 56 of hinge gap cover 36, as shown in FIG. 11 (i.e., when lid 12A has been opened so that flexible printed circuit 28 rests adjacent to hinge gap cover 36). If desired, hinge gap cover 36 may have other shapes (e.g., planar shapes, shapes that are bowed outwardly towards gap 30 rather than inwardly away from gap 30 towards the interior of device 10, etc.). The configuration of FIGS. 10 and 11 in which hinge gap cover 36 is curved inwardly and presents a convexly curved surface 56 to adjacent structures such as flexible printed circuit 28 is merely illustrative.

FIGS. 12, 13, 14, 15, 16, and 17 are cross-sectional side views of the housing of device 10 in various different hinge gap cover configurations.

Figure 12:
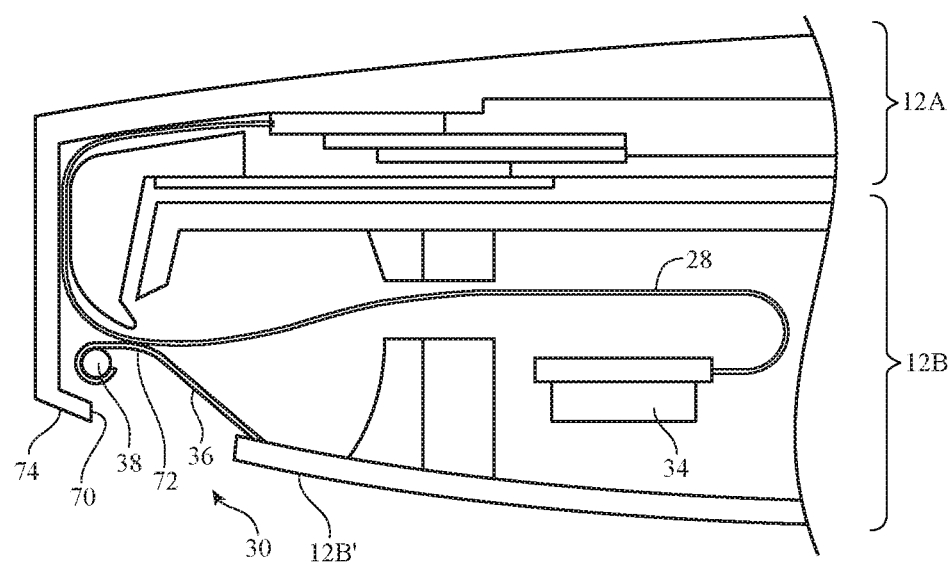
FIG. 12 is a cross-sectional side view of an illustrative laptop computer that in a closed position in accordance with an embodiment.

The cross-sectional side view of FIG. 12 shows how housing 12B may have an extended portion 12B' that helps reduce the size of gap 30. In the configuration of FIG. 12, device 10 is in its closed position and hinge gap cover 36 is covering gap 30. Cover 36 may be bowed inwardly so that flexible printed circuit 28 is not exposed to excess wear when upper housing 12A is rotated to place device 10 in its open position (FIG. 13).

Housing 12A may have a stop feature that contacts hinge gap cover 36 as device 10 is placed in its open position. As shown in FIG. 12, for example, portion 74 of housing 12A may form stop surface 70. When housing 12A is closed, stop surface 70 is not in contact with mating surface 72 of hinge gap cover 36. When housing 12A is opened, surface 70 will come into contact with surface 72 and will lift hinge gap cover 36 away from lower housing 12B (i.e., cover 36 will be raised away from extended portion 12B' of housing 12B, as shown in FIG. 13).

Figure 13:
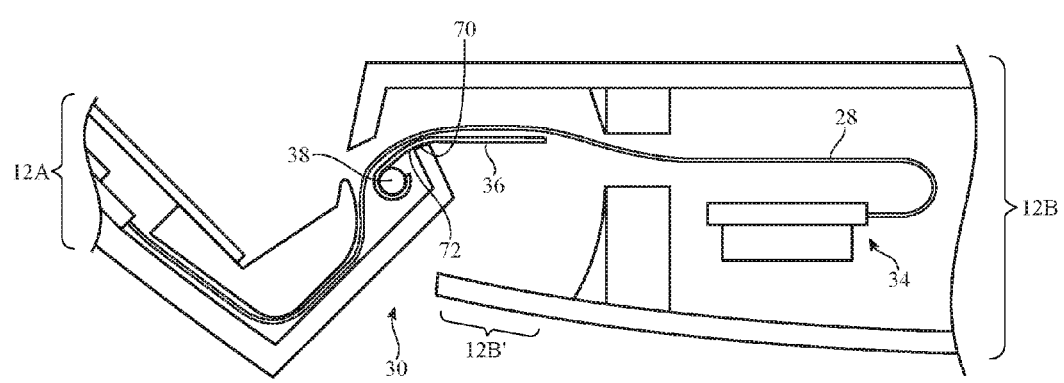
FIG. 13 is a cross-sectional side view of the illustrative laptop computer of FIG. 12 in an open position in accordance with an embodiment.
Figure 14:
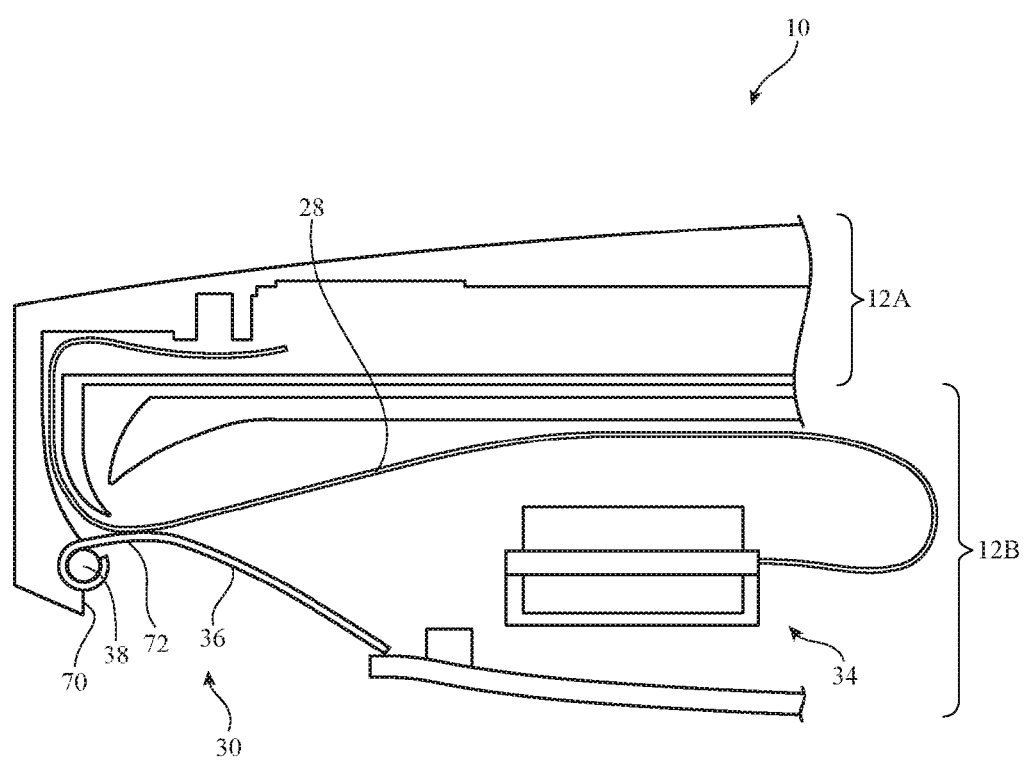
FIG. 14 is a cross-sectional side view of an illustrative laptop computer with a hinge cover that covers a relatively large gap in accordance with an embodiment.
Figure 15:
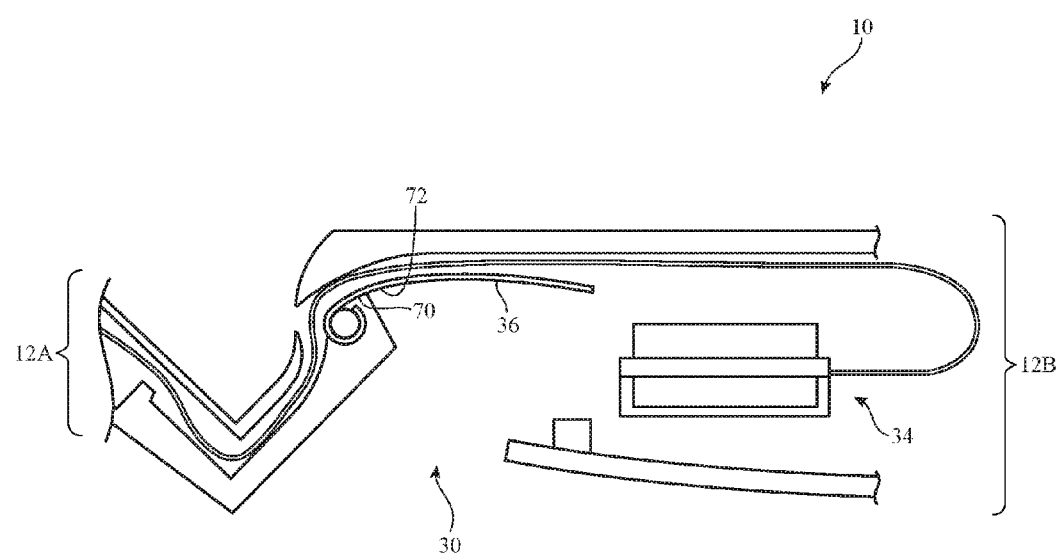
FIG. 15 is a cross-sectional side view of the illustrative laptop computer of FIG. 14 in an open position in accordance with an embodiment.

The cross-sectional side view of FIG. 14 shows how gap 30 may be somewhat wider in a configuration in which rear housing extended portion 12B' of FIGS. 12 and 13 is not present. In the configuration of FIG. 14, device 10 is in its closed position and hinge gap cover 36 is covering gap 30. In the closed position, stop surface 70 is not in contact with surface 72 of hinge gap cover 36 (i.e., the portion of cover 36 adjacent to spring 38). As with cover 36 of FIGS. 12 and 13, cover 36 of device 10 in FIG. 14 may be bowed inwardly so that flexible printed circuit 28 is not exposed to excess wear when upper housing 12A is rotated to place device 10 in its open position (FIG. 15). When housing 12A is opened, surface 70 of housing 12A may contact surface 72 of hinge gap cover 36 and may lift hinge gap cover 36 away from housing 12B, as shown in FIG. 15.

Figure 16:
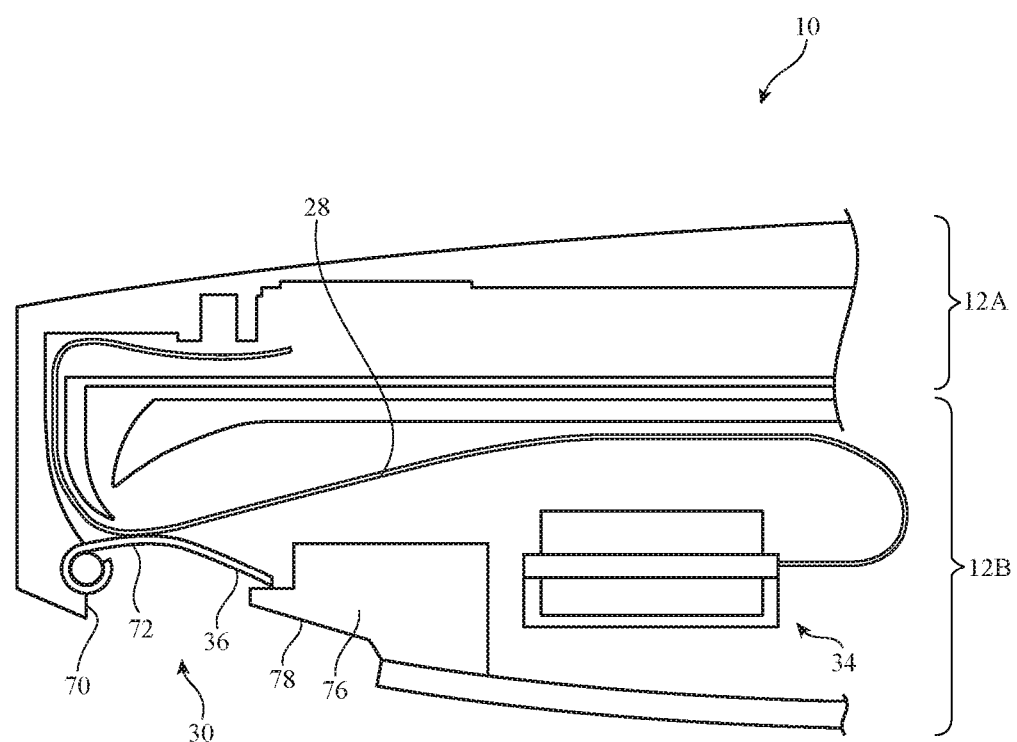
FIG. 16 is a cross-sectional side view of an illustrative laptop computer that has an internal housing wall that allows a hinge gap cover to be reduced in size in accordance with an embodiment.

The cross-sectional side view of illustrative device 10 of FIG. 16 shows how gap 30 may be reduced in size when lower housing 12B is provided with an internal wall member such as member 76. Member 76 may be used to help hide internal components 34 from view. Member 76 may have a surface such as surface 78 that is exposed within gap 30. Surface 78 may be recessed relative to adjacent surfaces of housing 12B to help reduce the visibility of surface 78. In the configuration of FIG. 16, device 10 is in its closed position and hinge gap cover 36 is covering gap 30. Stop surface 70 is not in contact with surface 72 of hinge gap cover 36. Cover 36 may be bowed inwardly, so that flexible printed circuit 28 is not exposed to excess wear when upper housing 12A is rotated into its open position (FIG. 17) to cause stop surface 70 to contact surface 72 of cover 36 and move cover 36 away from lower housing 12B (and thereby uncover gap 30), as shown in FIG. 17.

Figure 17:
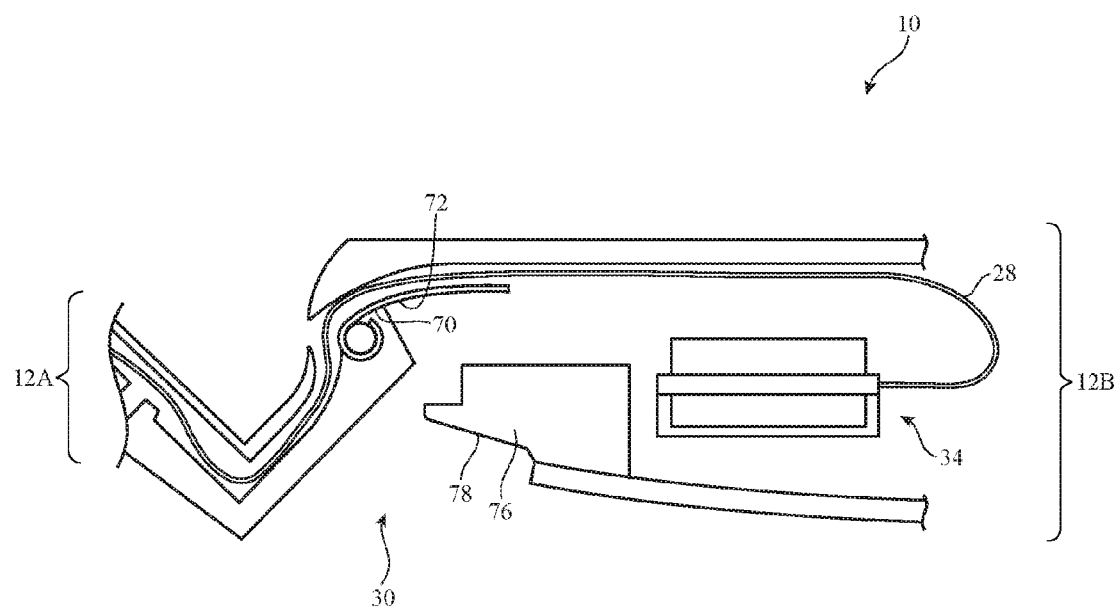
FIG. 17 is a cross-sectional side view of the illustrative laptop computer of FIG. 16 in an open position in accordance with an embodiment.

Internal structures such as structure 76 of FIGS. 16 and 17 that help partly cover gap 30 may be formed from metal (e.g., the same metal that is used in forming housing 12B or a different metal) or may be formed from dielectric materials. As an example, structure 76 may be a plastic member that helps hide internal components from view through gap 30 while allowing antenna signals associated with an antenna in device 10 (e.g., component 34) to pass through the plastic member. Conductive antennas structures may, if desired, be supported by internal wall structures such as structures 76 or other internal structures adjacent to gap 30.

The foregoing is merely illustrative and various modifications can be made by those skilled in the art without departing from the scope and spirit of the described embodiments. The foregoing embodiments may be implemented individually or in any combination.

What is claimed is:
1. A portable computer, comprising:
a first housing portion that defines an internal cavity in which are carried components, at least one of which is an input device;

a second housing portion pivotally coupled to the first housing portion by a hinge assembly and capable of carrying a display assembly, wherein the first and second housing portions are separated from each other by a gap that extends along a rear edge of the first housing portion; and a gap cover that includes a layer of flexible material, the gap cover mounted to the second housing portion, wherein in a closed position when the first and second housing portions are positioned such that the display and the input device are adjacent to each other, the gap cover overlays the gap, otherwise, the gap cover is held away from the gap.

2. The portable computer of claim 1, wherein the first housing portion carries a keyboard.

3. The portable computer of claim 1, wherein the gap cover is configured to prevent intrusion of contaminants into the internal cavity when the first and second housing portions are in the closed position.

4. The portable computer of claim 1, wherein the gap cover prevents the components carried within the internal cavity from being seen when the first and second housing portions are in the closed position.

5. The portable computer of claim 1, wherein one of the components includes an antenna, the antenna being capable of generating a wireless signal capable of passing through the gap cover when the first and second housing portions are in the closed position.

6. The portable computer of claim 1, wherein the gap cover further includes openings capable of venting heated air from the internal cavity.

7. The portable computer of claim 1, wherein the components includes a flexible circuit that is disposed within the internal cavity and extends between the first and second housing portions, and wherein the gap cover prevents the flexible circuit from being seen when the first and second housing portions are in the closed position.

8. The portable computer of claim 7, wherein the gap cover has a curved profile that bows inwardly towards the flexible circuit.

9. The portable computer of claim 1, wherein the gap cover has an elongated rectangular shape.

10. The portable computer of claim 1, wherein the gap cover comprises a dielectric material.

11. An electronic device, comprising:
a housing having first and second housing portions that are separated by a gap, the first housing portion having a display and the second housing portion having an input device;
a hinge that bridges the gap and connects the first housing portion to the second housing portion; and
a gap cover including a layer of thin flexible material, the gap cover being mounted to the first housing portion and extending towards the second housing portion and covering at least a portion of the gap, wherein the first housing portion is configured to rotate between a closed position in which the gap cover covers the gap and an open position in which the gap cover is held away from the second housing portion by the first housing portion.

12. The electronic device defined in claim 11, wherein the hinge comprises first and second hinges that allow the first housing portion to rotate about a hinge axis relative to the second housing portion.

13. The electronic device of claim 11, further comprising a flexible circuit that is arranged to extend across the gap and wherein the gap cover prevents the flexible circuit from being seen when the first housing portion is in the closed position.

14. The electronic device defined in claim 11, further comprising an antenna that produces antenna signals that pass through the gap cover.

15. A method for assembling a portable computer, comprising:
coupling a first housing portion to a second housing portion at a hinge to form a housing unit, the first housing portion and the second housing portion being separated by a gap, the second housing portion being configured to be moveable between a closed position in which a display of the second housing portion is held adjacent to the first housing portion and an open position in which the display is separated from the first housing portion; and
mounting a conformable layer of material to the second housing portion to cover the gap when the second housing portion is in the closed position, wherein the layer of material is moved away from the gap by the second housing so that the layer of material does not cover the gap when the second housing is moved to the open position.

16. The method of claim 15, wherein the portable computer further comprises an antenna and wherein the layer of material is radio frequency transparent such that antenna signals from the antenna pass through the layer of material.

17. The method of claim 15, wherein a shape of the layer of material changes when the second housing rotates between the open and closed positions.

18. The method of claim 15, wherein the portable computer further comprises at least one flexible circuit that bridges the gap between the second and first housing portions, wherein the layer of material overlaps the flexible circuit and blocks the flexible circuit from view when the second housing portion is in the closed position.

19. The method of claim 15, wherein the conformable layer of material is manipulated by the second housing portion when the second housing portion rotates between the open and closed positions.

20. The method of claim 15, wherein the first housing portion includes an input device.

* * * * *